(12) United States Patent
Goto

(10) Patent No.: US 12,509,594 B2
(45) Date of Patent: Dec. 30, 2025

(54) AQUEOUS COATING ADDITIVE, AQUEOUS COATING COMPOSITION, AND COATING AGENT

(71) Applicant: SHIN-ETSU CHEMICAL CO., LTD., Tokyo (JP)

(72) Inventor: Tomoyuki Goto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 924 days.

(21) Appl. No.: 17/770,716

(22) PCT Filed: Sep. 30, 2020

(86) PCT No.: PCT/JP2020/037110
§ 371 (c)(1),
(2) Date: Apr. 21, 2022

(87) PCT Pub. No.: WO2021/095386
PCT Pub. Date: May 20, 2021

(65) Prior Publication Data
US 2022/0372310 A1    Nov. 24, 2022

(30) Foreign Application Priority Data
Nov. 15, 2019  (JP) .................................. 2019-206990

(51) Int. Cl.
*C09D 7/65*   (2018.01)
*C08G 77/46*  (2006.01)
*C09D 5/16*   (2006.01)

(52) U.S. Cl.
CPC .............. *C09D 7/65* (2018.01); *C08G 77/46* (2013.01); *C09D 5/1637* (2013.01)

(58) Field of Classification Search
None
See application file for complete search history.

(56) References Cited

U.S. PATENT DOCUMENTS

| | | | | | |
|---|---|---|---|---|---|
| 4,504,410 | A | * | 3/1985 | Hempel | C08G 77/46 516/124 |
| 5,057,361 | A | * | 10/1991 | Sayovitz | D06M 13/144 428/447 |
| 5,319,015 | A | * | 6/1994 | Gebhardt | B29C 33/64 264/300 |
| 5,525,640 | A | * | 6/1996 | Gerkin | C08J 9/0061 528/25 |
| 5,837,793 | A | * | 11/1998 | Harashima | C08J 3/12 524/588 |
| 6,187,891 | B1 | * | 2/2001 | Rautschek | B01D 19/0409 568/675 |
| 6,461,597 | B1 | * | 10/2002 | Morita | A61K 8/025 424/DIG. 2 |
| 6,605,183 | B1 | * | 8/2003 | Rautschek | B01D 19/0404 524/265 |
| 6,858,663 | B2 | * | 2/2005 | Knott | C08G 77/46 524/588 |
| 7,964,032 | B2 | * | 6/2011 | Rajaraman | C09D 11/03 524/265 |
| 9,346,919 | B2 | * | 5/2016 | Jazkewitsch | C08G 77/18 |
| 9,951,169 | B2 | * | 4/2018 | Yang | C09D 5/024 |
| 2002/0192181 | A1 | | 12/2002 | Williams et al. | |
| 2010/0068386 | A1 | * | 3/2010 | Kanbe | C09D 11/322 427/256 |
| 2010/0184935 | A1 | | 7/2010 | Oberhellman et al. | |
| 2012/0153210 | A1 | | 6/2012 | Glos et al. | |
| 2016/0096939 | A1 | | 4/2016 | Glos et al. | |
| 2017/0210913 | A1 | * | 7/2017 | Dubey | C09D 183/12 |
| 2021/0292560 | A1 | * | 9/2021 | Takada | C08G 77/12 |
| 2022/0372310 | A1 | * | 11/2022 | Goto | C08G 81/00 |

FOREIGN PATENT DOCUMENTS

| | | | | | |
|---|---|---|---|---|---|
| CN | 101528756 | B | * | 6/2015 | ............ C08G 77/46 |
| CN | 109563346 | A | | 4/2019 | |
| GB | 2385056 | A | * | 8/2003 | |
| JP | 2000515885 | A | * | 11/2000 | |
| JP | 2003-170005 | A | | 6/2003 | |
| JP | 2004346146 | A | * | 12/2004 | |
| JP | 2006-160887 | A | | 6/2006 | |
| JP | 2009-185169 | A | | 8/2009 | |
| JP | 2009-532524 | A | | 9/2009 | |
| JP | 2013-166830 | A | | 8/2013 | |
| JP | 2018-070683 | A | | 5/2018 | |
| TW | 201704350 | A | * | 2/2017 | ............ A61K 8/046 |
| WO | 02/074870 | A1 | | 9/2002 | |
| WO | WO-2014059132 | A2 | * | 4/2014 | ........... B01D 53/228 |
| WO | WO-2014074560 | A1 | * | 5/2014 | ............ B01D 3/228 |
| WO | 2018/029966 | A1 | | 2/2018 | |

OTHER PUBLICATIONS

Dec. 15, 2020 International Search Report issued in International Patent Application No. PCT/JP2020/07110.
May 17, 2022 International Preliminary Report on Patentability issued in International Patent Application No. PCT/JP2020/07110.
Nov. 7, 2022 Search Report issued in Chinese Application No. 202080078880.8.
Nov. 16, 2023 Search Report issued in European Patent Application No. 20888653.1.

* cited by examiner

*Primary Examiner* — Sanza L. McClendon
(74) *Attorney, Agent, or Firm* — Oliff PLC

(57) ABSTRACT

An aqueous coating additive containing a polyether-modified siloxane represented by an average composition formula (1): $(R_3SiO_{1/2})_a(R_2R'SiO_{1/2})_{a'}(R_2SiO_{2/2})_b(RR'SiO_{2/2})_{b'}(RSiO_{3/2})_c(SiO_{4/2})_d$. "R"'s each represent an organic group selected from groups represented by $—C_qH_{2q}—O—(C_2H_4O)_e(C_3H_6O)_f—R^1$. The R' groups satisfy expression (I): $5 \le \{(\text{molecular weight of the } —C_2H_4O— \text{ moiety})/(\text{molecular weight of an entire polyether-modified siloxane})\} \times 20 \le 10$; and expression (II): $\{(\text{molecular weight of the } —C_3H_6O— \text{ moiety})/(\text{molecular weight of the } —C_2H_4O— \text{ moiety})\} \le 1.0$. This provides an additive for an aqueous coating and an aqueous coating composition that have little environmental impact and that provide excellent antifouling performance.

20 Claims, No Drawings

AQUEOUS COATING ADDITIVE, AQUEOUS COATING COMPOSITION, AND COATING AGENT

TECHNICAL FIELD

The present invention relates to an aqueous coating additive. In addition, the present invention relates to an aqueous coating composition and a coating agent that contain the coating additive, and in further detail, relates to a coating composition and a coating agent that have stain-proofing performance.

BACKGROUND ART

In recent years, coating with paints is applied for the purpose of stain-proofing in various uses including electric appliances, such as mobile phones, personal computers, televisions, and plasma displays, transport equipment, such as automobiles and trains, and extending to various daily necessities.

As a paint excellent in stain-proofing property, a composition containing an additive containing fluorine in molecules thereof is commonly known (Patent Document 1). However, since materials are expensive, and moreover, from a viewpoint of environmental problems, additives containing no fluorine are desired. Similarly, from a viewpoint of environmental problems, aqueous coatings are attracting attention as the paint to be used.

As a coating additive containing no fluorine, polyether-modified silicones are widely used for the purpose of achieving surface-leveling property, antifoaming property, etc. (Patent Document 2). However, no polyether-modified silicones are known that provide excellent stain-proofing performance.

CITATION LIST

Patent Literature

Patent Document 1: JP 2018-070683 A
Patent Document 2: JP 2013-166830 A

SUMMARY OF INVENTION

Technical Problem

The present invention has been made in view of such circumstances, and an object thereof is to provide an additive and a coating composition for aqueous coatings, that is, an aqueous coating additive and an aqueous coating composition that have little environmental impact and that provide excellent antifouling performance. Another object of the present invention is to provide a coating agent that contains the coating composition, has little environmental impact, and provides excellent antifouling performance.

Solution to Problem

To achieve the object, the present invention provides an aqueous coating additive comprising a polyether-modified siloxane represented by an average composition formula (1):

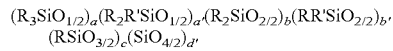

$(R_3SiO_{1/2})_a(R_2R'SiO_{1/2})_{a'}(R_2SiO_{2/2})_b(RR'SiO_{2/2})_{b'}(RSiO_{3/2})_c(SiO_{4/2})_{d'}$

In the formula (1), "R"s are each independent, are identical to or different from one another, and each represent a hydrogen atom, a hydroxy group, a monovalent hydrocarbon group having 1 to 18 carbon atoms, or an alkoxy group having 1 to 10 carbon atoms, "R'"s are each independent, are identical to or different from one another, and each represent an organic group selected from groups represented by $-C_qH_{2q}-O-(C_2H_4O)_e(C_3H_6O)_f-R^1$, $R^1$s are each independent, are identical to or different from one another, and each represent a hydrogen atom, a hydrocarbon group having 1 to 30 carbon atoms, or an organic group represented by $R^6-(CO)-$, $R^6$ represents a hydrocarbon group having 1 to 30 carbon atoms, $0 \leq a \leq 15$, $0 \leq a' \leq 15$, $5 \leq b \leq 1000$, $0 \leq b' \leq 50$, $1 \leq c \leq 10$, $0 \leq d \leq 5$, "e" and "f" respectively satisfy $2 \leq e \leq 200$ and $0 \leq f \leq 200$, "q" satisfies $2 \leq q \leq 10$, $2 \leq a'+b' \leq 50$, $2 \leq e+f \leq 200$, and the R' groups satisfy the following expressions (I) and (II):

$5 \leq \{(\text{molecular weight of the } -C_2H_4O- \text{ moiety})/(\text{molecular weight of an entire polyether-modified siloxane of the formula (1)})\} \times 20 \leq 10;$     expression (I):

$\{(\text{molecular weight of } -C_3H_6O\text{-moiety})/(\text{molecular weight of } -C_2H_4O- \text{ moiety})\} \leq 1.0.$     expression (II):

Such a coating additive has little environmental impact, and can provide excellent antifouling performance. Furthermore, the inventive coating additive can exhibit high compatibility with water. That is, the inventive coating additive is an aqueous coating additive. Therefore, by using the inventive aqueous coating additive, it is possible to provide an aqueous coating composition taking the environmental aspect into consideration.

The "R"s in the formula (1) preferably do not contain a methoxy group or an ethoxy group.

Such an aqueous coating additive can provide more excellent stability over time.

Preferably, d=0 in the formula (1).

A coating additive containing such a polyether-modified siloxane can provide more excellent compatibility with other components including water when a coating composition is formed.

The polyether-modified siloxane preferably has a dispersity (Mw/Mn) of 1.70 to 2.70 in a gel permeation chromatography measurement in terms of polystyrene.

An aqueous coating additive containing such a polyether-modified siloxane can provide more excellent antifouling performance. In addition, such a polyether-modified siloxane can have favorable compatibility and can exhibit high ease in synthesis.

Furthermore, the present invention provides an aqueous coating composition comprising the above-described aqueous coating additive.

Such an aqueous coating composition can achieve an aqueous coating composition containing an aqueous coating additive that has little environmental impact and that provides excellent antifouling performance.

Furthermore, the inventive aqueous coating composition preferably comprises a resin selected from the group consisting of urethane resin, acrylic resin, amide resin, phenolic resin, epoxy resin, melamine resin, urea resin, alkyd resin, polyimide resin, polyalkylene resin, polyvinyl chloride, polystyrene, polyvinyl acetate, and an alloy of the resins.

Various resins are applicable to the inventive coating composition as described.

In this event, the resin is preferably urethane resin, acrylic resin, or epoxy resin.

These resins are preferable since they have good compatibility with the above-described aqueous coating additive.

The inventive aqueous coating composition is preferably for an antifouling coating.

The inventive aqueous coating composition can exhibit excellent antifouling property without degrading various coating performances, such as antifoaming property and leveling property.

Furthermore, the present invention provides a coating agent comprising the above-described aqueous coating composition.

The inventive coating agent can exhibit excellent antifouling property without degrading various coating performances, such as antifoaming property and leveling property.

Advantageous Effects of Invention

By using the inventive aqueous coating additive, it is possible to provide an aqueous coating composition and a coating agent that have little environmental impact and that are excellent in antifouling property.

DESCRIPTION OF EMBODIMENTS

As described above, there have been demands for the development of a coating additive and a coating composition that have little environmental impact and that provide excellent antifouling performance.

Likewise, in view of environmental problems, there have been demands for the development of an aqueous coating additive and coating composition, in which water can be used as a solvent.

To achieve the above-described object, the present inventor has earnestly studied and found out that a newly synthesized coating additive containing a polyether-modified siloxane having a specific structure provides aqueous paints with excellent antifouling performance, and completed the present invention.

That is, the present invention provides an aqueous coating additive comprising a polyether-modified siloxane represented by an average composition formula (1):

$$(R_3SiO_{1/2})_a(R_2R'SiO_{1/2})_{a'}(R_2SiO_{2/2})_b(RR'SiO_{2/2})_{b'}(RSiO_{3/2})_c(SiO_{4/2})_d \quad (1)$$

In the formula (1), "R"s are each independent, are identical to or different from one another, and each represent a hydrogen atom, a hydroxy group, a monovalent hydrocarbon group having 1 to 18 carbon atoms, or an alkoxy group having 1 to 10 carbon atoms, "R'"s are each independent, are identical to or different from one another, and each represent an organic group selected from groups represented by —$C_qH_{2q}$—O—($C_2H_4O)_e(C_3H_6O)_f$—$R^1$, $R^1$s are each independent, are identical to or different from one another, and each represent a hydrogen atom, a hydrocarbon group having 1 to 30 carbon atoms, or an organic group represented by $R^6$—(CO)—, $R^6$ represents a hydrocarbon group having 1 to 30 carbon atoms, $0 \le a \le 15$, $0 \le a' \le 15$, $5 \le b \le 1000$, $0 \le b' \le 50$, $1 \le c \le 10$, $0 \le d \le 5$, "e" and "f" respectively satisfy $2 \le e \le 200$ and $0 \le f \le 200$, "q" satisfies $2 \le q \le 10$, $2 \le a'+b' \le 50$, and $2 \le e+f \le 200$.

In addition, the R' groups satisfy the following expressions (I) and (II):

$5 \le \{$(molecular weight of the —$C_2H_4$O— moiety)/(molecular weight of an entire polyether-modified siloxane of the formula (1))$\} \times 20 \le 10$;  expression (I):

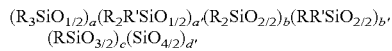

{(molecular weight of —$C_3H_6$O-moiety)/(molecular weight of —$C_2H_4$O— moiety)}$\le 1.0$.  expression (II):

Hereinafter, the present invention will be described in further detail, but the present invention is not limited thereto.

<Aqueous Coating Additive>

The inventive aqueous coating additive contains a polyol-modified siloxane (siloxane-branched type polyether-modified silicone) represented by the following average composition formula (1):

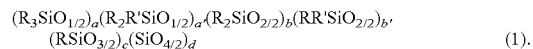

$$(R_3SiO_{1/2})_a(R_2R'SiO_{1/2})_{a'}(R_2SiO_{2/2})_b(RR'SiO_{2/2})_{b'}(RSiO_{3/2})_c(SiO_{4/2})_d \quad (1).$$

In the formula (1), "R"s are each independent, may be identical to or different from one another, and each represent a hydrogen atom, a hydroxy group, a monovalent hydrocarbon group having 1 to 18 carbon atoms, or an alkoxy group having 1 to 10 carbon atoms. Examples of the monovalent hydrocarbon group having 1 to 18 carbon atoms include alkyl groups, aryl groups, and aralkyl groups. Preferable examples include alkyl groups, aryl groups, and aralkyl groups having 1 to 12 carbon atoms, and particularly preferable examples include a methyl group, an ethyl group, a propyl group, a hexyl group, an octyl group, a dodecyl group, and a phenyl group. A methyl group, an ethyl group, or a phenyl group is the most preferable. Examples of the alkoxy group having 1 to 10 carbon atoms include linear, branched, or cyclic aliphatic alkoxy and substituted or unsubstituted aromatic alkoxy groups, and a propoxy group or an isopropoxy group is particularly preferable. From the aspect of stability over time, methoxy groups and ethoxy groups are preferably not contained. That is, it is particularly preferable for the "R"s in the formula (1) not to contain a methoxy group or an ethoxy group. Furthermore, out of all the "R"s in the formula (1), 98% or more are preferably each a monovalent hydrocarbon group having 1 to 18 carbon atoms, particularly preferably, 99% or more are each a monovalent hydrocarbon group having 1 to 18 carbon atoms, and most preferably, 99.5% or more are each a monovalent hydrocarbon group having 1 to 18 carbon atoms.

In the formula (1), "R'"s are each independent, may be identical to or different from one another, and each represent an organic group selected from groups represented by —$C_qH_{2q}$—O—($C_2H_4O)_e(C_3H_6O)_f$—$R^1$. $R^1$s are each independent, may be identical to or different from one another, and each represent a hydrogen atom, a hydrocarbon group having 1 to 30 carbon atoms, or an organic group represented by $R^6$—(CO)—. As the hydrocarbon group having 1 to 30 carbon atoms, a hydrocarbon group having 1 to 10 carbon atoms is preferable in view of availability. $R^6$ is preferably a hydrocarbon group having 1 to 10 carbon atoms in view of availability. "e", "f", and "q" respectively satisfy $2 \le e \le 200$, $0 \le f \le 200$, $2 \le q \le 10$, and $2 \le e+f \le 200$. In view of availability, "e", "f", and "q" preferably satisfy respectively $2 \le e \le 50$, $0 \le f \le 50$, and $2 \le q \le 5$, and "e" and "f" preferably satisfy $3 \le e+f \le 100$. If e+f is less than 2, antifouling property is degraded. Meanwhile, if e+f is greater than 200, synthesis is difficult. Note that when an R' group contains both an ethyleneoxide unit and a propyleneoxide unit, these two units may constitute a block polymer or may constitute a random polymer.

In addition, the R' groups satisfy the following expressions (I) and (II):

$5 \le \{$(molecular weight of the -$C_2H_4$O— moiety)/(molecular weight of the entire polyether-modified siloxane of the formula (1))$\} \times 20 \le 10$;  expression (I):

{(molecular weight of the —$C_3H_6$O-moiety)/(molecular weight of the —$C_2H_4$O— moiety)}$\le 1.0$.expression (II):

In the expression (I), if {(molecular weight of the —$C_2H_4$O— moiety)/(molecular weight of the entire polyether-modified siloxane of the formula (1))}×20 is below the above-described range, compatibility with water and other hydrophilic components in the aqueous coating composition is degraded, causing separation or degradation of leveling property (generation of spots). If {(molecular weight of the —$C_2H_4O$— moiety)/(molecular weight of the entire polyether-modified siloxane of the formula (1))}×20 exceeds the above-described range, this leads to degradation of antifouling property. In addition, if {(molecular weight of the —$C_3H_6O$-moiety)/(molecular weight of the —$C_2H_4O$— moiety)} exceeds the above-described range in the expression (II), not only is compatibility with water and other hydrophilic components in the coating composition degraded, causing separation or degradation of leveling property (generation of spots), this also leads to degradation of antifouling property.

The expression (I) is preferably 5.5≤{(molecular weight of the —$C_2H_4O$— moiety)/(molecular weight of the entire polyether-modified siloxane of the formula (1))}×20≤9, and the expression (II) is preferably {(molecular weight of the —$C_3H_6O$— moiety)/(molecular weight of the —$C_2H_4O$— moiety)}≤0.5. In this case, more excellent compatibility with water and other hydrophilic components in the aqueous coating composition and antifouling property can be exhibited.

The (molecular weight of the —$C_2H_4O$— moiety) in the expressions (I) and (II) corresponds to the value of the "e" in the formula of the R' group. Meanwhile, the (molecular weight of the —$C_3H_6O$— moiety) in the expression (II) corresponds to the value of the "f" in the formula of the R' group.

"a", "a'", "b", "b'", "c", and "d" respectively satisfy 0≤a≤15, 0≤a'≤15, 5≤b≤1000, 0≤b'≤50, 1≤c≤10, 0≤d≤5, and 2≤a'+b'≤50. If "a", "a'", "b", "b'", "c", and "d" deviate from the above ranges, properties (antifouling property, compatibility, antifoaming property, and leveling property) become unstable when a coating composition is formed. In addition, "c" preferably satisfies 1≤c≤8, particularly preferably 1≤c≤6, and "d" is preferably 0. If "c" exceeds 10, antifoaming property is degraded, and if 0, antifouling property is degraded. If "d" becomes greater, compatibility with water and other hydrophilic components in the aqueous coating composition is degraded.

The polyether-modified siloxane (siloxane-branched type polyether-modified silicone) represented by the formula (1) preferably has a dispersity (Mw/Mn) of 1.70 to 2.70, particularly preferably 1.80 to 2.60, and further preferably 1.85 to 2.50 in a gel permeation chromatography (GPC) measurement in terms of polystyrene. When the dispersity is 1.70 to 2.70, more excellent antifouling property can be provided. Moreover, a polyether-modified siloxane having a dispersity of 1.70 to 2.70 can have excellent compatibility and can exhibit high ease in synthesis.

The polyether-modified siloxane (siloxane-branched type polyether-modified silicone) represented by the formula (1) has a weight-average molecular weight of 1000 to 100,000, preferably 2,000 to 80,000, and particularly preferably 4,000 to 40,000 in GPC in terms of polystyrene. A polyether-modified siloxane having a weight-average molecular weight of 1000 to 100,000 can provide more excellent antifouling property. Moreover, a polyether-modified siloxane having a weight-average molecular weight of 1000 to 100,000 can exhibit a viscosity suitable for handling, and can prevent problems of compatibility with resins.

The inventive aqueous coating additive may consist of the above-described polyether-modified siloxane alone, or may further contain a solvent in addition to the polyether-modified siloxane. When a solvent is contained, homogenization by stirring is easier when the inventive aqueous coating additive is added to an aqueous coating composition. In addition, other components may be contained as necessary.

As solvents that can be blended in the inventive aqueous coating additive, those described in the description of the aqueous coating composition below can be used, for example, and water, propylene glycol monomethyl ether acetate, or butyl acetate is preferable. In addition, when a solvent is contained, the inventive coating additive can be, for example, a 10 to 90% solution, preferably a 10 to 50% solution, further preferably a 15 to 30% solution of the above-described polyether-modified siloxane.

The inventive aqueous coating additive has little environmental impact, and can provide excellent antifouling performance. In addition, the inventive aqueous coating additive can exhibit high compatibility with water and other hydrophilic components in the aqueous coating composition. Accordingly, the inventive aqueous coating additive can provide an aqueous coating composition that takes environmental problems into further consideration.

<Method for Producing Polyether-Modified Siloxane>

The polyether-modified siloxane (siloxane-branched type polyether-modified silicone) represented by the formula (1) contained in the inventive aqueous coating additive can be produced by a production method including the following steps (I) and (II), for example.

Step (I) is a step of using a compound represented by an average composition formula (2): $R'''_3SiO_{1/2})_g(R''_2SiO_{2/2})_h(R''SiO_{3/2})_i(SiO_{4/2})_j$ (in the formula (2), "R'''"s are each independent, are identical to or different from one another, and each represent a hydroxy group or a monovalent hydrocarbon group having 1 to 18 carbon atoms, 0≤g≤10, 0≤h≤100, 1≤i≤30, and 0≤j≤8) and a compound represented by an average composition formula (3): $(R''_2SiO_{2/2})_k(R''HSiO_{2/2})_l$ and/or a compound represented by a general formula (4): $(R''_3SiO_{1/2})_m(R''_2HSiO_{1/2})_n(R''_2SiO_{2/2})_o(R''HSiO_{2/2})_p$ (4) (in the formulae (3) and (4), "R'''"s are as described above, and 0≤k≤6, 0≤l≤6, 0≤m≤2, 0≤n≤2, 0≤o≤500, 0≤p≤100, 3≤k+l≤8, n+m=2, and 0≤o+p≤500) to synthesize a compound represented by an average composition formula (5):
$(R''_3SiO_{1/2})_a(R''_2HSiO_{1/2})_{a'}(R''_2SiO_{2/2})_b(R''HSiO_{2/2})_{b'}(R''SiO_{3/2})_c(SiO_{4/2})_d$ (in the formula (5), "R'''", "a", "a'", "b", "b'", "c", and "d" are as described above), and step (II) is a step of causing a reaction between the compound of the formula (5) and a compound represented by an average composition formula (6): $CH_2=CX-C_rH_{2r}-O-(C_2H_4O)_e(C_3H_6O)_f-R^1$ (in the formula (6), $R^1$, "e", and "f" are as described above, X represents a hydrogen atom or a monovalent hydrocarbon group having 1 to 5 carbon atoms, and 0≤r≤8).

In the formulae (2) to (5), "R'''"s are each independent, may be identical to or different from one another, and each represent a hydroxy group or a monovalent hydrocarbon group having 1 to 18 carbon atoms. Preferably, the "R'''"s each represent an alkyl group, aryl group, or aralkyl group having 1 to 12 carbon atoms, particularly preferably a methyl group, an ethyl group, a propyl group, a hexyl group, an octyl group, a dodecyl group, or a phenyl group, and most preferably a methyl group, an ethyl group, or a phenyl group.

"g", "h", "i", "k", "l", "m", "n", "o", and "p" respectively satisfy 0≤g≤10, 0≤h≤100, 1≤i≤30, 0≤j≤8, 0≤k≤6, 0≤l≤6, 0≤m≤2, 0≤n≤2, 0≤o≤500, 0≤p≤100, 3≤k+l≤8, n+m=2, and 0≤o+p≤500.

X represents a hydrogen atom or a monovalent hydrocarbon group having 1 to 5 carbon atoms, and 0≤r≤8. In view of availability, X is preferably a hydrogen atom or a methyl group, and "r" preferably satisfies 0≤r≤2.

"R'"", "a", "a'", "b", "b'", "c", and "d" are as described above.

The compound represented by the formula (2) can be called, for example, an organopolysiloxane. Meanwhile, the compound represented by the formula (3) can be called, for example, a cyclic organopolysiloxane. In addition, the compound represented by the formula (4) can be called, for example, a linear organopolysiloxane.

Step (I) is, for example, a ring-opening and equilibration reaction between the organopolysiloxane represented by the formula (2) and the cyclic organopolysiloxane represented by the formula (3) and/or the linear organopolysiloxane represented by the formula (4) in the presence of an acid catalyst. Examples of the catalyst include methanesulfonic acid, trifluoromethanesulfonic acid, sulfuric acid, hydrochloric acid, etc., and among these, trifluoromethanesulfonic acid is particularly preferable.

The amount of the catalyst can be a catalytic amount. For example, when trifluoromethanesulfonic acid is used, the catalytic amount is preferably 50 to 10000 ppm, particularly preferably 100 to 5000 ppm, and most preferably 200 to 2000 ppm relative to the total mass of the compounds of the formula (2), formula (3), and formula (4). When the catalytic amount is within the preferable ranges, sufficient reaction speed can be realized, and in addition, the removal of the catalyst can be prevented from becoming complicated.

The reaction temperature in step (I) is not particularly limited, but is preferably 0 to 100° C., further preferably 20 to 50° C. When the reaction temperature of step (I) is 0 to 100° C., sufficient reaction speed can be achieved while preventing the volatilization of the raw materials.

Step (I) can be performed in a system without a solvent or with a solvent. Specific examples of the solvent to be used include alkanes such as pentane, hexane, cyclopentane, cyclohexane, methylcyclohexane, and ethylcyclohexane, aromatic compounds such as benzene, toluene, xylene, and ethylbenzene, ethers such as diethyl ether, ethylpropyl ether, glyme, and diglyme, etc.

The compound represented by the formula (5) obtained in step (I) can be called, for example, an organohydrogensiloxane or an organohydrogenpolysiloxane. Meanwhile, the compound represented by the formula (6) used in step (II) can be called, for example, an alkenyl group-containing polyether or a polyoxyalkylene compound.

Step (II) is, for example, an addition reaction between the organohydrogenpolysiloxane represented by the formula (5) and the alkenyl group-containing polyether represented by the general formula (6), and is performed in the presence of an addition-reaction catalyst. As the addition-reaction catalyst, a catalyst that is generally used in an addition reaction can be used. For example, a noble metal catalyst such as a platinum group metal-based compound can be used, and examples thereof include platinum-based, palladium-based, rhodium-based, and ruthenium-based catalysts and so forth. Among these, a platinum-based catalyst is preferably used. Furthermore, as the platinum-based catalyst, chloroplatinic acid, an alcohol solution or aldehyde solution of chloroplatinic acid, a complex of chloroplatinic acid with various olefins or vinylsiloxanes, etc. may be used, for example. In particular, a solution of complex catalyst (Karstedt's catalyst) of a chloroplatinic acid neutralized by sodium hydrogen carbonate-vinylsiloxane can be used suitably.

In step (II), the compound represented by the general formula (5) and the compound represented by the formula (6) are made to react with one another in such a manner that the structure of the compound represented by the average composition formula (1) obtained as a result of this step (II) satisfies the expressions (I) and (II) regarding the R' group. Specific examples will be shown in the Examples (Synthesis Examples) below.

In step (II), the ratio of the alkenyl group-containing polyether represented by the general formula (6) to the organohydrogenpolysiloxane represented by the general formula (5), the ratio being [number of moles of alkenyl groups in a component of the formula (6)]/[number of moles of Si—H groups in a component of the formula (5)], is preferably 1.00 to 2.00, more preferably 1.05 to 1.50, and even more preferably 1.02 to 1.10.

The amount of the addition-reaction catalyst can be a catalytic amount. In particular, the amount is preferably 0.1 to 100 ppm, particularly preferably 0.5 to 50 ppm, and most preferably 1 to 20 ppm in terms of metal relative to the total amount of the compound of the formula (5) and the compound of the formula (6). When the addition-reaction catalyst is used in an amount within the preferable ranges, sufficient reaction speed can be achieved while suppressing a side reaction.

The reaction temperature in step (II) is not particularly limited, but is preferably 0 to 150° C., further preferably 20 to 100° C. When the reaction temperature of step (II) is 0 to 150° C., sufficient reaction speed can be achieved while preventing a side reaction.

In step (II), a reaction solvent may be used according to necessity. Examples of the solvent include aromatic hydrocarbon solvents, such as toluene and xylene; aliphatic hydrocarbon solvents, such as hexane, methylcyclohexane, and ethylcyclohexane; ether-based solvents such, as dioxane, dibutyl ether, and dimethoxyethane; ester-based solvents, such as ethyl acetate and butyl acetate; nitrile-based solvents, such as acetonitrile and benzonitrile; alcohol-based solvents such as ethanol, propanol, isopropyl alcohol, and butanol; and the like. In particular, from the view point of compatibility with a reaction substrate, isopropyl alcohol and toluene are preferable. Solvents other than primary alcohols such as ethanol, propyl alcohol, and butanol are preferable since a dehydrogenation reaction between hydroxy groups and SiH groups can be prevented.

<Aqueous Coating Composition>

Furthermore, the present invention also relates to an aqueous coating composition containing the aqueous coating additive containing the polyether-modified siloxane (siloxane-branched type polyether-modified silicone) of the formula (1), in particular, an aqueous coating composition that is for an antifouling coating.

The added amount of the polyether-modified siloxane is, for example, 0.01 to 10 parts by mass, preferably 0.1 to 5 parts by mass in 100 parts by mass of the aqueous coating composition. When the added amount of the polyether-modified siloxane is 0.01 to 10 parts by mass, sufficient stain-proofing property (antifouling property) can be exhibited while suppressing cost.

The coating composition preferably contains a resin. The resin is not particularly limited, but is preferably selected from the group consisting of urethane resin, acrylic resin, amide resin, phenolic resin, epoxy resin, melamine resin, urea resin, alkyd resin, polyimide resin, polyalkylene resin, polyvinyl chloride, polystyrene, polyvinyl acetate, and an alloy of the resins. In view of compatibility, urethane resin, acrylic resin, or epoxy resin is preferable. As described, various resins can be applied to the inventive coating composition. An alloy of resins is a polymer given a new property by mixing a plurality of polymers. An alloy of resins can also be called a polymer alloy.

The added amount of the resin is, for example, 10 to 99.5 parts by mass, preferably 30 to 90 parts by mass in 100 parts by mass of the aqueous coating composition. A coating composition having a resin content of 10 parts by mass or more can provide a coating layer (coating film) having sufficient mechanical strength.

In addition, other components well known in the industry may be appropriately blended in the inventive coating composition as necessary, for example, a curing agent, a diluent, a UV-absorber, a polymerization initiator, a polymerization inhibitor, a stabilizer (a light stabilizer, a weathering stabilizer, and a heat stabilizer), an antioxidant, a levelling agent, a defoaming agent, a viscosity modifier, an anti-settling agent, a pigment, a dye, a dispersant, an antistatic agent, an anti-fogging agent, and rubbers.

As the curing agent, an isocyanate compound that can be used in an aqueous coating composition is useful, and examples thereof include aliphatic isocyanate (e.g., a hexamethylene diisocyanate derivative, manufactured by Covestro, Bayhydur XP 2655), etc. The amount of the curing agent is not particularly limited, but is, for example, 1 to 30 parts by mass, preferably 3 to 20 parts by mass in 100 parts by mass of the aqueous coating composition.

Examples of the diluent include water, alcohols, esters, aliphatic hydrocarbons, aromatic hydrocarbons, ketones, etc. Water, propylene glycol methyl ether, dipropylene glycol methyl ether, propylene glycol monomethyl ether acetate, butyl acetate methyl ethyl ketone, and/or methyl isobutyl ketone are preferable. Water, propylene glycol methyl ether, and/or dipropylene glycol methyl ether are particularly preferable. The amount of the diluent is not particularly limited, and is, for example, 10 to 90 parts by mass, preferably 20 to 70 parts by mass in 100 parts by mass of the aqueous coating composition.

The viscosity (25° C., B-type viscometer) of the inventive coating composition is, for example, 1 to 10000 mPa·s, preferably 10 to 5000 mPa·s, considering applicability, film thickness, etc.

The inventive aqueous coating composition contains the above-described aqueous coating additive, and therefore, has little environmental impact and can provide excellent antifouling performance. Accordingly, the inventive coating composition is particularly useful for an antifouling coating. Furthermore, the inventive coating composition can exhibit excellent antifouling property without losing various coating properties such as antifoaming property and leveling property. Furthermore, the inventive aqueous coating composition contains the above-described aqueous coating additive, which has high compatibility with water and other hydrophilic components, and therefore, can be an aqueous coating composition that takes environmental problems into further consideration.

<Coating Agent>

Additionally, the present invention also relates to a coating agent using the above-described aqueous coating composition.

The inventive coating agent may consist of the above-described coating composition alone, or may further contain a solvent in addition to the coating composition. That is, the inventive coating agent contains the above-described coating composition. As the solvent to be contained in the inventive coating agent, a diluent given in the description of the coating composition can be used, for example.

The inventive coating agent contains the above-described aqueous coating composition, and therefore, has little environmental impact and can realize a coating layer that exhibits excellent antifouling performance. Furthermore, the inventive coating agent can exhibit excellent antifouling property without losing various coating properties such as antifoaming property and leveling property.

<Coating Layer>

A coating layer can be formed from the inventive coating agent according to an appropriate method.

As a method for applying the coating agent (coating composition) to obtain a coating layer by using the inventive coating agent, various methods employed for common paints can be used. That is, examples include spray coating, spin coating, roll coating, curtain coating, brushing, electrostatic application, anion/cation electrodeposition application, dipping, etc. In addition, a method for curing after the application is not particularly limited, but in particular, examples include (heat-)curing at 0 to 200° C., more preferably at 40 to 180° C.

Meanwhile, examples of a substrate (object to be coated) to which the coating layer can be applied include plastics, such as polystyrene resin, acrylic resin, acrylonitrile-styrene-butadiene resin (ABS), polypropylene, ethylene-propylene resin, polycarbonate resin, NORYL resin, nylon resin, polyester resin, and blended products (alloys) of these and polyolefin, a reinforcing agent such as a filler, glass, or carbon fiber; thermosetting resins, such as epoxy resin, unsaturated polyester resin, and urethane resin; inorganic materials, such as glass, mortar, asbestos cement slate, and rock; metals, such as iron (and alloys), copper (and alloys), aluminum (and alloys), and magnesium (and alloys); inflammables, such as paper and vinyl fabric; etc.

As described, the inventive coating agent can be applied to various substrates. In addition, a coating layer formed from the above-described coating agent can exhibit excellent antifouling property.

EXAMPLE

Hereinafter, the present invention will be described in more detail with reference to Examples and Comparative Examples. However, the present invention is not restricted to the following Examples.

[Weight-Average Molecular Weight (Mw), Dispersity (Mw/Mn)]

The weight-average molecular weight (Mw) and dispersity (Mw/Mn) of the polyether-modified siloxane contained in the inventive coating additive can be determined by employing gel permeation chromatography (GPC) measurement. Mn indicates number-average molecular weight. In the following Examples (Synthesis Examples), the weight-average molecular weight and dispersity of each compound was measured under the following conditions.

Name of apparatus: HLC-8320GPC (manufactured by TOSOH Corporation)

Developing solvent: THF (tetrahydrofuran)

Column: the following columns were connected in series for use.

TSKgel Guardcolumn SuperH-H (manufactured by TOSOH Corporation)

TSKgel SuperHM-N (manufactured by TOSOH Corporation)

TSKgel SuperH2500 (manufactured by TOSOH Corporation)

TSKgel SuperH-RC (manufactured by TOSOH Corporation)

Column temperature: 40° C.
Flow rate: 0.6 mL/min
Detector: RI (accompanying HLC-8320)
Charge concentration: 0.3%
Charge amount: 50 μL
Calibration curve: polystyrene standard (PStQuick Kit-L, TSKstandard F-288)

[Structure Analysis]

The structure of the polyether-modified siloxane contained in the inventive coating additive can be determined by $^1$H NMR measurement and $^{29}$Si NMR measurement. In the following Examples (Synthesis Examples), the structure of each compound was identified under the following conditions.

Name of apparatus: ECX5000II (manufactured by JEOL Ltd.)
Measuring solvent: CDCL3 (chloroform)

From the results of the GPC measurement and NMR measurement, the molecular weight of the entire polyether-modified siloxane, the molecular weight of the —$C_2H_4O$— moiety and the molecular weight of the —$C_3H_6O$-moiety can also be determined.

Synthesis Example 1

A reactor was charged with 311 g of tris(trimethylsiloxy)methylsilane (compound (2-1)), 4190 g of 1,1,3,3,5,5,7,7-octamethylcyclotetrasiloxane (compound (3-1)), and 331 g of 1,3,5,7-tetramethylcyclotetrasiloxane (compound (3-2)). Then, 3.86 g of trifluoromethanesulfonic acid was added, and a reaction was allowed to proceed at 50° C. for 8 hours. After the reaction, the temperature of the liquid was lowered to 40° C., 23.2 g of KYOWAAD SH-500 (manufactured by Kyowa Chemical Industry Co., Ltd., hydrotalcite) was added and stirred for 1 hour, and the solid contents were removed by filtration. Further after that, low-boiling components were removed over 5 hours at 150° C./2 torr while bubbling nitrogen. Thus, an organohydrogensiloxane represented by the following average composition formula (5-1) was synthesized with a yield of 87% (step (I)).

Next, 161.8 g of the organohydrogensiloxane represented by the following average composition formula (5-1) obtained in step (I), 132.8 g of a polyoxyalkylene compound of the following average composition formula (6-1), and 132.8 g of isopropyl alcohol were mixed in a reactor. 0.05 g of a 3 mass % solution of chloroplatinic acid in isopropyl alcohol was added thereto, and this was made to react at 80° C. for 3 hours (step (II)).

$((CH_3)_3SiO_{1/2})_3((CH_3)_2SiO_{2/2})_{55.5}((CH_3)HSiO_{2/2})_{5.5}$
$((CH_3)SiO_{3/2})_1$ average composition formula (5-1)

$CH_2$=$CHCH_2O(C_2H_4O)_{12.5}H$ Average composition formula (6-1)

After the completion of the reaction, the solvent was distilled off from the obtained solution at 120° C./2 torr over 2 hours. Then, a compound (polyether-modified siloxane) (A) of an organopolysiloxane represented by the following average composition formula was obtained with a yield of 95%.

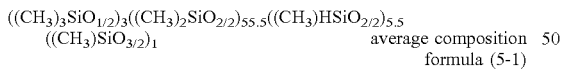

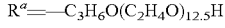

When the compound (A) was analyzed by GPC, the weight-average molecular weight Mw was 14,900, the dispersity (Mw/Mn) was 1.97, (molecular weight of the —$C_2H_4O$— moiety)/(molecular weight of the entire compound (A))}×20 was 7.49, and (molecular weight of the —$C_3H_6O$— moiety)/(molecular weight of the —$C_2H_4O$— moiety) was 0.

Synthesis Example 2

In step (I), an organohydrogensiloxane represented by the following average composition formula (5-2) was synthesized with a yield of 87% in the same manner as in Example 1 except that 163 g of compound (2-1), 4320 g of compound (3-1), and 350 g of compound (3-2) were used.

Next, in step (II), a compound (polyether-modified siloxane) (B) of an organopolysiloxane represented by the following average composition formula was obtained with a yield of 96% in the same manner as in Synthesis Example 1 except that 195 g of the organohydrogensiloxane represented by the following average composition formula (5-2) obtained in step (I), 169 g of the polyoxyalkylene compound of the average composition formula (6-1), and 169 g of isopropyl alcohol were mixed in a reactor.

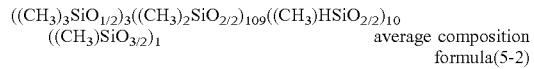

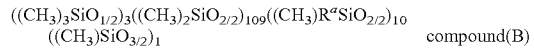

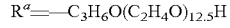

When the compound (B) was analyzed by GPC, the weight-average molecular weight Mw was 24700, the dispersity (Mw/Mn) was 1.96, (molecular weight of the —$C_2H_4O$— moiety)/(molecular weight of the entire compound (B))}×20 was 7.31, and (molecular weight of the —$C_3H_6O$— moiety)/(molecular weight of the —$C_2H_4O$— moiety) was 0.

Synthesis Example 3

A compound (polyether-modified siloxane) (C) of an organopolysiloxane represented by the following average composition formula was obtained with a yield of 96% in the same manner as in Synthesis Example 1 except that 220 g of the organohydrogensiloxane represented by the average composition formula (5-2), 147 g of a polyoxyalkylene compound of the following average composition formula (6-2), and 147 g of isopropyl alcohol were mixed in a reactor.

$CH_2$=$CHCH_2O(C_2H_4O)_{9.5}H$ Average composition formula (5-2)

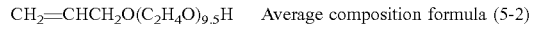
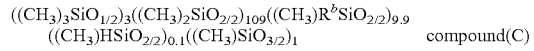

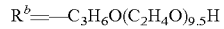

When the compound (C) was analyzed by GPC, the weight-average molecular weight Mw was 24800, the dispersity (Mw/Mn) was 2.06, (molecular weight of the —$C_2H_4O$— moiety)/(molecular weight of the entire compound (C))}×20 was 6.05, and (molecular weight of the —$C_3H_6O$— moiety)/(molecular weight of the —$C_2H_4O$— moiety) was 0.

Synthesis Example 4

In step (I), an organohydrogensiloxane represented by the average composition formula (5-3) was synthesized with a yield of 87% in the same manner as in Example 1 except that 478 g of an organosiloxane represented by the following average composition formula (2-2) was used instead of the compound (2-1), and that in addition, 2846 g of the compound (3-1), 340 g of the compound (3-2), and furthermore, 1178 g of the dimethylsiloxane represented by the average composition formula (4-1) were used.

Next, in step (II), a compound (polyether-modified siloxane) (D) of an organopolysiloxane represented by the following average composition formula was obtained with a yield of 95% in the same manner as in Synthesis Example 1 except that 180 g of the organohydrogensiloxane represented by the following average composition formula (5-3) obtained in step (I), 145 g of the polyoxyalkylene compound of the average composition formula (6-1), and 145 g of isopropyl alcohol were mixed in a reactor.

$((CH_3)_3SiO_{1/2})_5((CH_3)_2SiO_{2/2})_{109}((CH_3)HSiO_{2/2})_{10}$
$((CH_3)SiO_{3/2})_3$ average composition formula(5-3)

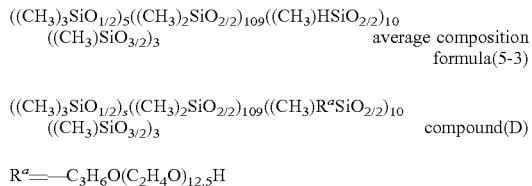

compound(D)

$R^a = -C_3H_6O(C_2H_4O)_{12.5}H$

When the compound (D) was analyzed by GPC, the weight-average molecular weight Mw was 27100, the dispersity (Mw/Mn) was 2.46, (molecular weight of the $-C_2H_4O-$ moiety)/(molecular weight of the entire compound (D))}×20 was 7.19, and (molecular weight of the $-C_3H_5O-$ moiety)/(molecular weight of the $-C_2H_4O-$ moiety) was 0.

Synthesis Example 5

A compound (polyether-modified siloxane) (E) of an organopolysiloxane represented by the following average composition formula was obtained with a yield of 95% in the same manner as in Synthesis Example 1 except that 145 g of the organohydrogensiloxane represented by the average composition formula (5-2), 213 g of a polyoxyalkylene compound of the following average composition formula (6-3), and 145 g of isopropyl alcohol were mixed in a reactor.

$CH_2=CHCH_2O(C_2H_4O)_{15}(C_3H_6O)_5H$ Average composition formula(6-3)

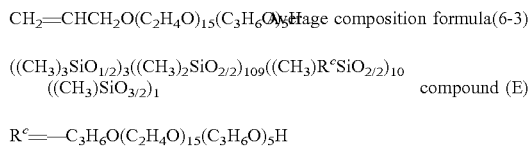

compound (E)

$R^c = -C_3H_6O(C_2H_4O)_{15}(C_3H_6O)_5H$

When the compound (E) was analyzed by GPC, the weight-average molecular weight Mw was 30700, the dispersity (Mw/Mn) was 1.87, (molecular weight of the $-C_2H_4O-$ moiety)/(molecular weight of the entire compound (E))}×20 was 6.94, and (molecular weight of the $-C_3H_6O-$ moiety)/(molecular weight of the $-C_2H_4O-$ moiety) was 0.44.

Synthesis Example 6

A compound (polyether-modified siloxane) (F) of an organopolysiloxane represented by the following average composition formula was obtained with a yield of 96% in the same manner as in Synthesis Example 1 except that 236 g of the organohydrogensiloxane represented by the average composition formula (5-2), 140 g of a polyoxyalkylene compound of the following average composition formula (6-4), and 140 g of isopropyl alcohol were mixed in a reactor.

$CH_2=CHCH_2O(C_2H_4O)_{7.7}H$ Average composition formula (6-4)

$((CH_3)_3SiO_{1/2})_3((CH_3)_2SiO_{2/2})_{109}((CH_3)R^dSiO_{2/2})_{10}$
$((CH_3)SiO_{3/2})_1$ compound (F)

$R^d = -C_3H_6O(C_2H_4O)_{7.7}H$

When the compound (F) was analyzed by GPC, the weight-average molecular weight Mw was 25700, the dispersity (Mw/Mn) was 2.11, (molecular weight of the $-C_2H_4O-$ moiety)/(molecular weight of the entire compound (F))}×20 was 5.24, and (molecular weight of the $-C_3H_5O-$ moiety)/(molecular weight of the $-C_2H_4O-$ moiety) was 0.

Example 1

116 g of Bayhydrol A 2651 (manufactured by Covestro, 41% acrylic resin aqueous dispersion), 4.65 g of water, 23.3 g of Bayhydur XP 2655 (manufactured by Covestro, aqueous curing agent, isocyanate-based), and 4.00 g of dipropylene glycol methyl ether were mixed to prepare a base material A. A 25% solution of the compound (A) obtained in Synthesis Example 1 in dipropylene glycol methyl ether was added as an additive for an aqueous coating in an amount of 0.80 g to 20 g of the base material A. After that, the obtained mixture was mixed by using a disperser until homogeneous. Thus, an aqueous coating composition was produced. After leaving to stand for 30 minutes, the obtained coating composition was applied onto glass by using an applicator so as to achieve a thickness of 30 μm. This was heat-cured at 80° C. for 90 minutes to form a coating layer (1). The obtained coating layer (1) was subjected to various evaluations according to the following.

Compatibility . . . the coating composition was uniformly mixed using a disperser, and after leaving to stand for 10 minutes, the state of the coating composition was observed.
Good: transparent.
Fair: slightly clouded.
Poor: clouded or separated.
Antifoaming property . . . the coating composition was uniformly mixed using a disperser, and after leaving to stand for 10 minutes, the state of the coating composition was observed.
Good: no foam.
Fair: some fine foam present.
Poor: a large amount of foam present.
Leveling property . . . the surface state of the coating layer on the glass was observed visually.
Good: a level surface state.
Fair: fine pockmarks present on some parts of the surface.
Poor: large pockmarks or waviness present on the surface.
Antifouling property . . . a line was drawn on the coating layer on the glass by using an oil-based pen, and evaluation was conducted on how easily the line disappeared when wiped with a tissue.
Good: the line disappeared easily.
Fair: the line disappeared when wiped repeatedly with force.
Poor: the line did not disappear.

Examples 2 to 6

Except that a 25% solution of one of the compounds (B) to (F) in dipropylene glycol methyl ether was respectively used instead of the 25% solution of the compound (A) in dipropylene glycol methyl ether, coating layers (2) to (6) were formed in the same manner as in Example 1, and were evaluated regarding each property.

Comparative Example 1

Except that the 25% of the compound (A) in dipropylene glycol methyl ether solution was not added, a coating layer (7) was formed in the same manner as in Example 1, and was evaluated regarding each property.

Comparative Examples 2 to 4

Except that a 25% solution of one of the compounds (G) to (I) of the following formulae in dipropylene glycol methyl ether was respectively used instead of the 25% solution of the compound (A) in dipropylene glycol methyl ether, coating layers (8), (9), and (10) were formed in the same manner as in Example 1, and were evaluated regarding each property. Note that as a result of the measurement, the values of the dispersity (Mw/Mn), (molecular weight of the —$C_1H_4O$-moiety)/(molecular weight of each entire compound)}×20, and (molecular weight of the —$C_3H_6O$— moiety)/(molecular weight of the —$C_2H_4O$— moiety) of each of the compounds were as shown in the following Table 1.

$((CH_3)_3SiO_{1/2})_2((CH_3)_2SiO_{2/2})_{6C}((CH_3)R^bSiO_{2/2})_3$    compound (G)

$((CH_3)_3SiO_{1/2})_2((CH_3)_2SiO_{2/2})_{75}((CH_3)R^bSiO_{2/2})_5$    compound (H)

$((CH_3)_3SiO_{1/2})_3((CH_3)_2SiO_{2/2})_{61}((CH_3)R^bSiO_{2/2})_4$
$((CH_3)SiO_{3/2})_1$    compound (I)

$R^b$=$C_3H_6O(C_2H_4O)_{9.5}H$

TABLE 1

| | Dispersity (Mw/Mn) | {(Molecular weight of —$C_2H_4O$— moiety)/ (molecular weight of entire compound)} × 20 | (Molecular weight of —$C_3H_6O$— moiety)/ (molecular weight of —$C_2H_4O$— moiety) |
|---|---|---|---|
| Compound (G) | 1.56 | 4.04 | 0 |
| Compound (H) | 1.59 | 4.98 | 0 |
| Compound (I) | 1.87 | 4.80 | 0 |

The results of Examples 1 to 6 and Comparative Examples 1 to 4 are shown in the following Table 2.

TABLE 2

| | | Compatibility | Antifoaming property | Leveling property | Antifouling property |
|---|---|---|---|---|---|
| Example 1 | Coating layer (1) | Good | Good | Good | Good |
| Example 2 | Coating layer (2) | Good | Good | Good | Good |
| Example 3 | Coating layer (3) | Good | Good | Good | Good |
| Example 4 | Coating layer (4) | Good | Good | Good | Good |
| Example 5 | Coating layer (5) | Good | Good | Good | Good |
| Example 6 | Coating layer (6) | Good (fair) | Good | Good | Good |
| Comparative Example 1 | Coating layer (7) | Good | Fair | Poor | Poor |
| Comparative Example 2 | Coating layer (8) | Poor | Good | Poor | Poor |
| Comparative Example 3 | Coating layer (9) | Poor | Good | Fair | Poor |
| Comparative Example 4 | Coating layer (10) | Poor | Good | Good | Good |

As shown in Table 2, it was revealed that the coating layers (1) to (6) formed using the inventive aqueous coating additives exhibited excellent antifouling property without losing compatibility, antifoaming property, or leveling property.

On the other hand, in Comparative Example 1, in which an aqueous coating additive containing no polyether-modified siloxane was used, it was not possible to achieve good results regarding any of antifoaming property, leveling property, or antifouling property, although good compatibility was exhibited. Meanwhile, in Comparative Examples 2 and 3, the coating layers (8) and (9) were each formed using a coating additive containing a polyether-modified siloxane. However, in the polyether-modified siloxanes contained in these coating additives, the "c" in the average composition formula (1) was 0, and the polyether-modified siloxanes were linear, and in addition, the relationship of the expression (I) was not satisfied. Therefore, the polyether-modified siloxanes were different from the polyether-modified siloxanes contained in the inventive aqueous coating compositions. For this reason, it was not possible to achieve an excellent antifouling property in Comparative Examples 2 and 3.

In Comparative Example 4, too, the coating layer (10) was formed using a coating additive containing a polyether-modified siloxane. However, in the polyether-modified siloxane used in Comparative Example 4, the value of [(molecular weight of the —$C_2H_4O$-moiety)/(molecular weight of the entire compound (I)))×20] was 4.80, and did not satisfy the expression (I). For this reason, in Comparative Example 4, it was not possible to achieve a good result regarding compatibility, although good results were exhibited regarding antifoaming property, leveling property, and antifouling property.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. An aqueous coating additive comprising a polyether-modified siloxane represented by an average composition formula (1):

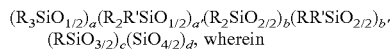
$(R_3SiO_{1/2})_a(R_2R'SiO_{1/2})_{a'}(R_2SiO_{2/2})_b(RR'SiO_{2/2})_{b'}$
$(RSiO_{3/2})_c(SiO_{4/2})_d$, wherein in the formula (1), "R"s are each independent, are identical to or different from one another, and each represent a hydrogen atom, a hydroxy group, a monovalent hydrocarbon group having 1 to 18 carbon atoms, or an alkoxy group having 1 to 10 carbon atoms, "R'"s are each independent, are identical to or different from one another, and each represent an organic group selected from groups represented by $-C_qH_{2q}-O-(C_2H_4O)_e(C_3H_6O)_f-R^1$, $R^1$s are each independent, are identical to or different from one another, and each represent a hydrogen atom, a hydrocarbon group having 1 to 30 carbon atoms, or an organic group represented by $R^6-(CO)-$, $R^6$ represents a hydrocarbon group having 1 to 30 carbon atoms, $0 \le a \le 15$, $0 \le a' \le 15$, $5 \le b \le 1000$, $0 \le b' \le 50$, $1 \le c \le 10$, $0 \le d \le 5$, "e" and "f" respectively satisfy $2 \le e \le 200$ and $0 \le f \le 200$, "q" satisfies $2 \le q \le 10$, $2 \le a'+b' \le 50$, $2 \le e+f \le 200$, and the R' groups satisfy the following expressions (I) and (II):

$5 \le \{$(molecular weight of the $-C_2H_4O-$ moiety)/ (molecular weight of an entire polyether-modified siloxane of the formula (1))$\} \times 20 \le 10$;  expression (I):

$\{$(molecular weight of $-C_3H_6O-$ moiety)/(weight-average molecular weight of $-C_2H_4O-$ moiety)$\} \le 1.0$,  expression (II):

wherein the weight-average molecular weight of the entire polyether-modified siloxane of the formula (1) is determined by employing gel permeation chromatography GPC measurement, the molecular weight of the-$C_2H_4O$-moiety is obtained by a procedure where the polyether-modified siloxane of the formula (1) is subjected to $^1$H NMR measurement and $^{29}$Si NMR measurement to find a number of the $-C_2H_4O-$ moiety per one mole of the polyether-modified siloxane, and the number of the $-C_2H_4O-$ moiety is multiplied by 44 to obtain the molecular weight of the $-C_2H_4O-$ moiety, and the molecular weight of the $-C_3H_6O-$ moiety is obtained by a procedure where the polyether-modified siloxane of the formula (1) is subjected to $^1$H NMR measurement and $^{29}$Si NMR measurement to find a number of the $-C_3H_6O-$ moiety per one mole of the polyether- modified siloxane, and the number of the $-C_3H_6O-$ moiety is multiplied by 58 to obtain the molecular weight of the $C_3H_6O-$ moiety.

2. The aqueous coating additive according to claim 1, comprising the polyether-modified siloxane, wherein the "R"s in the formula (1) do not contain a methoxy group or an ethoxy group.

3. The aqueous coating additive according to claim 1, comprising the polyether-modified siloxane, wherein d =0 in the formula (1).

4. The aqueous coating additive according to claim 2, comprising the polyether-modified siloxane, wherein d =0 in the formula (1).

5. The aqueous coating additive according to claim 1, comprising the polyether-modified siloxane, having a dispersity (Mw/Mn) of 1.70 to 2.70 in a gel permeation chromatography measurement in terms of polystyrene.

6. The aqueous coating additive according to claim 2, comprising the polyether-modified siloxane, having a dispersity (Mw/Mn) of 1.70 to 2.70 in a gel permeation chromatography measurement in terms of polystyrene.

7. The aqueous coating additive according to claim 3, comprising the polyether-modified siloxane, having a dispersity (Mw/Mn) of 1.70 to 2.70 in a gel permeation chromatography measurement in terms of polystyrene.

8. The aqueous coating additive according to claim 4, comprising the polyether-modified siloxane, having a dispersity (Mw/Mn) of 1.70 to 2.70 in a gel permeation chromatography measurement in terms of polystyrene.

9. An aqueous coating composition comprising the aqueous coating additive according to claim 1.

10. An aqueous coating composition comprising the aqueous coating additive according to claim 2.

11. An aqueous coating composition comprising the aqueous coating additive according to claim 3.

12. An aqueous coating composition comprising the aqueous coating additive according to claim 4.

13. An aqueous coating composition comprising the aqueous coating additive according to claim 5.

14. An aqueous coating composition comprising the aqueous coating additive according to claim 6.

15. An aqueous coating composition comprising the aqueous coating additive according to claim 7.

16. An aqueous coating composition comprising the aqueous coating additive according to claim 8.

17. The aqueous coating composition according to claim 9, comprising a resin selected from the group consisting of urethane resin, acrylic resin, amide resin, phenolic resin, epoxy resin, melamine resin, urea resin, alkyd resin, polyimide resin, polyalkylene resin, polyvinyl chloride, polystyrene, polyvinyl acetate, and an alloy of the resins.

18. The aqueous coating composition according to claim 17, wherein the resin is urethane resin, acrylic resin, or epoxy resin.

19. The aqueous coating composition according to claim 9, being an aqueous coating composition for an antifouling coating.

20. A coating agent comprising the aqueous coating composition according to claim 9.

* * * * *